Patented Apr. 18, 1944

2,346,995

UNITED STATES PATENT OFFICE 2,346,995

ZINC-CALCIUM RESINATE AND PROCESS OF MAKING THE SAME

Robert C. Palmer, Anthony F. Oliver, and Edwin Edelstein, Pensacola, Fla., assignors to Newport Industries, Inc., Pensacola, Fla., a corporation of Delaware No Drawing. Application October 31, 1942, Serial No. 464,110

20 Claims. (Cl. 260—105)

This application is a continuation-in-part of application, Serial No. 297,108, by Robert C. Palmer, Anthony F. Oliver, and Edwin Edelstein, filed September 29, 1939, and entitled "Resin-like product and process of making the same."

This invention relates to solutions of zinc-calcium resinates and to a method of preparing such solutions by reactions carried out in solvent media.

By a "reaction carried out in a solvent medium" we mean a reaction carried out in a normally liquid solvent medium that can be recovered after the reaction is completed.

The term "resinate" is herein applied generally to include the salts of any of the resin acids, for instance, abietic, pimaric or sapinic acids or polymers or isomers thereof. Rosin containing one or more of these resin acids may be reacted as disclosed hereinbelow with zinc oxide or hydroxide and with lime to form the corresponding zinc-calcium resin acid salts.

As far as we know, stable, non-gelling solutions of zinc-calcium resinates capable of being isolated in the form of resin-like products distinguished by high clarity and permanent refusibility as well as by high zinc and high calcium contents have heretofore not been prepared.

By "stable, non-gelling solutions" we means solutions of resinous products in petroleum solvents and the like that do not gel when the solutions are heated to any temperatures short of their boiling points. By "gelling" we signify a thickening of a flowable solution by heating while a substantially constant concentration of solids is maintained therein, the solution finally becoming, in some cases, almost non-flowing at room temperature, and sometimes accompanied by the appearance of insoluble matter or precipitate.

The term "permanent refusibility," as applied herein to resin-like products, means a capacity for being repeatedly fused and solidified, without any change in the characteristic appearance of the products, provided that the temperatures to which the products are subjected are kept below those temperatures at which substantial decomposition occurs.

By the term "clarity" we mean a transparency due to the substantially complete absence of any unreacted zinc oxide, hydrated lime, or other zinc or calcium compounds used in preparing the resin-like products which, together with their solutions, constitute the present invention. Such unreacted zinc and lime compounds, if present, would of course tend to render the resin-like products opaque rather than transparent. The transparency of the resinate itself is an important characteristic of our products, even though for some purposes opacifying agents may be incorporated therein.

In referring to resinates having a high zinc and a high calcium content, we do not mean to limit ourselves to basic or even neutral zinc-calcium resinates, but to include slightly acid zinc-calcium resinates. When the neutral, acid, or basic character of a zinc oxide hydrated lime-rosin reaction product is referred to, the designated character of the reaction product as a whole is meant. This is done to avoid controversy over whether the zinc-calcium resinate itself may not be present in the reaction product as a basic zinc-calcium resinate even when the reaction product as a whole has an acid or neutral character.

One reason why those skilled in the art have heretofore not been able to prepare stable, non-gelling solutions of clear, permanently refusible zinc-calcium resinates having a high zinc and calcium content is the fact that ordinary rosin reacts only with difficulty, if at all, with zinc oxide and with lime and the like at temperatures below the decomposition temperature of the rosin. The reaction, even if initiated, does not go to completion but ceases long before a calculated neutrality has been effected. The acid zinc-calcium resinates of the prior art containing relatively small amounts of combined zinc and calcium are also characterized by infusibility and by the instability of their solutions in petroleum solvents.

We have now found that the reaction in a solvent medium between rosin containing material and zinc oxide, hydrated lime and the like can be carried so far as to produce even basic resinates if a suitable acidic catalyst such as a low molecular weight fatty acid is incorporated with the reacting mass.

There is apparently a definite relationship between the non-gelling of the solutions of the present invention and the permanent refusibility of the novel resin-like products that form these solutions, for gelling solutions are apparently formed only from products which are not permanently refusible and, conversely, all permanently refusible products form stable, non-gelling solutions.

In our novel solutions of zinc-calcium resinates having a high content of combined metals, in particular, a high zinc content, the combined calcium functions, inter alia, as a stabilizing agent for the combined zinc. Thus stable, non-gelling solutions of permanently refusible zinc-calcium resinates high in zinc content can be prepared from untreated or partially polymerized rosin containing material by reaction in solution with zinc oxide or hydroxide and with hydrated lime.

From rosin containing materials that include an amount of polymer in excess of about 7½%, stable, non-gelling solutions having a high zinc content can be prepared without the use of calcium resinate as a stabilizing agent although, of course, the presence of calcium resinate is in no way deleterious.

The value of our zinc-calcium resinate solutions lies not so much in their zinc content for its drier effect or in their calcium content for its hardening effect toward coating materials, as in making available stable, non-gelling solutions of novel, high melting point synthetic resin-like products for use as substitutes for or in conjunction with known synthetic resins, such as ester gum, alkyd and phenolic resins and their modifications. The permanently refusible resin-like products forming our novel solutions impart added properties of hardness, through drying, gloss, improved pigment dispersion and other valuable characteristics to varnish, enamels, inks and similar coatings.

It is therefore an important object of our invention to provide novel, high melting point, resin-like products in the form of zinc-calcium resinates of a permanently refusible character and ot provide stable, non-gelling solutions of such products, the products being clear resinates of zinc and calcium high in zinc content and being substantially free of uncombined metal and having the valuable properties of imparting hardness, through drying, improved pigment dispersion, and other desirable characteristics, to varnish, enamels, inks and similar coatings.

It is a further important object of this invention to provide a method for the preparation of such resin-like products from natural gum and wood rosins, pine oleoresin, partially polymerized rosins and pine oleoresin, hydrogenated rosins and pine oleoresin, and other resin acid-containing materials and also to provide a method for the preparation of stable, non-gelling solutions of such products.

It is a further important object of this invention to provide a method of making a substantially neutral or basic zinc-calcium resinate having permanently refusible characteristics.

Other and further important objects of this invention will become apparent from the following description and appended claims.

The starting material for our process may be either a pine oleoresin, a natural gum or wood rosin, a partially polymerized gum or wood rosin or pine oleoresin such as may be produced by a heat treatment or by a catalytic polymerization step, or a partially polymerized rosin that has also been subsequently heat treated or hydrogenated, or any other suitable rosin.

A partially polymerized rosin may suitably be obtained by heat treating gum or wood rosin in accordance with the method described and claimed in the Logan Patents Nos. 1,643,276 and 1,807,483. According to those patents, rosin is heated at a temperature between 260° C. and 325 C. for a period between eight hours for the lower temperature and ten minutes for the higher temperature. The amount of polymerization is greater the more prolonged the heat treatment. Best results in the present process are obtained when using the more drastically heat treated rosins. Where "heat treated" rosin is herein referred to, it will be understood to mean a rosin that has been subjected to a heat treatment such as described in the aforesaid Logan patents, or an equivalent heat treatment.

More complete polymerization may be effected by means of a catalyst in accordance with the methods of such patents as those to Schnorf No. 2,074,192; to Rummelsburg, No. 2,108,928 and 2,124,875; and to Morton, No. 2,107,866, or, preferably, in accordance with the method described and claimed in the Palmer and Bibb Patent No. 2,247,399, filed September 28, 1938, and granted July 1, 1941. Since the products so obtained are generally referred to be as polymerized rosins, that term will be used herein to designate rosins produced by the action of a polymerization catalyst.

To produce a non-gelling solution of a zinc-calcium resinate, from which a refusible resin can be recovered, where the desired ratio and amount of zinc and calcium necessitates more polymer than is obtainable by commercially practicable heat treatment, we may blend some chemically polymerized rosin with the heat treated rosin, or we may start with a natural gum or wood rosin with which has been blended a sufficient amount of a chemically polymerized rosin to give the desired results.

In accordance with our method, any one of such rosin-acid containing materials is reacted in solution with zinc oxide or hydroxide. For example, if a rosin is taken as a starting material, the rosin is dissolved in a solvent, such as a liquid hydrocarbon, preferably mineral spirits or other petroleum distillates, to form a solution preferably containing 50% by weight of rosin, a more preferred range being between 60 and 75% by weight of rosin based on the total weight of the solution. Terpene hydrocarbons and coal tar hydrocarbons such as toluene and xylene may also be used as solvents. A catalyst is incorporated with the solution, acetic acid being preferred. Any of the catalysts enumerated in the patent to Romaine et al. No. 1,884,407 may be employed, however, especially catalysts selected from the group consisting of organic acids soluble in rosin at the reaction temperature whose acidity is due to a carboxylic acid radical, organic acids soluble in rosin at the reaction temperature whose acidity is of a phenolic nature, and salts of said acids capable or reacting with abietic acid to liberate said acids, such as formic acid, lactic acid, tartaric acid, citric acid, or a metal (including ammonium) salt of these or other carboxylic acids, in particular, low molecular weight fatty acids.

The amount of catalyst to be added is in the neighborhood of 0.3 to 0.5% by weight of the rosin but may rise as high as 4%. Without a catalyst the reaction between the rosin and the zinc oxide will not ordinarily be initiated.

The rosin solution containing the added catalyst is heated, preferably to a temperature of from 100° to 150° C., although temperatures below 100° C. are also operative, and zinc oxide is added either dry, or, preferably, in a slurry of the solvent. The rosin solution is agitated during the addition of the zinc oxide and agitation is continued until the reaction has been completed. When all of the zinc oxide has reacted, the solution becomes clear.

If the rosin as used in the reaction just described has been partially polymerized by means of a catalyst to an extent of at least about 7½%, a stable, non-gelling neutral, or basic zinc resinate solution may be obtained without the addition of calcium oxide or calcium hydroxide to the zinc oxide-rosin reaction mass to form a zinc-calcium resinate. The calcium soap of the resin acids, however, serves as a stabilizer for the zinc resinate and is an indispensable ingredient of stable solutions of low acidity, or of neutral or basic zinc resinates prepared from pine oleoresins and natural gum and wood rosin and from heat treated rosins or other partially polymerized rosins having less than about 7½% of polymer.

If a solution of a basic zinc oxide-rosin reaction product is desired for subsequent reaction with calcium hydroxide, we may start with a rosin that has been partially polymerized by heat treatment and proceed in accordance with the following example:

EXAMPLE 1

60 parts by weight of heat treated rosin are dissolved in 40 parts by weight of mineral spirits (a petroleum distillate boiling between about 150° and 200° C.), about 0.3 part by weight of acetic acid added, and the solution heated to between 110° and 150° C. While agitating the solution, 6 to 9% of zinc oxide by weight of the rosin is added in the form of a slurry and heating continued until the reaction is complete.

In general, a non-gelling, permanently refusible resin-like product can not be recovered from the solution of Example 1 merely by distilling off the petroleum solvent, because water is also removed by such distillation and the solution thereupon gels. It is, however, possible to stabilize such solutions by the further reaction of the zinc oxide reacted rosin with hydrated lime, and from such stabilized solutions, a permanently refusible neutral or slightly acid, or basic resin-like product containing zinc and calcium resinates can be recovered. The products so recovered can again be dissolved in a solvent to reform a novel resinate solution according to this invention. In view of the fact that the novel solutions of this invention can be formed both directly by reaction of rosin containing material in a solvent medium with zinc oxide and with hydrated lime and indirectly by dissolving in a solvent the recovered resinates obtainable by such a reaction, the following discussion will describe both examples of such reactions and the recovery of resinates obtainable thereby.

The following will serve to illustrate our preferred procedure for making stable, non-gelling solutions of permanently refusible solid resin-like products containing zinc and calcium resinates:

EXAMPLE 2

To the solution of zinc oxide-rosin reaction product in a petroleum solvent obtained in accordance with Example 1 is added hydrated lime (Ca(OH)$_2$), preferably in a solvent slurry. All of the zinc oxide should have been reacted before any lime is added, because zinc oxide will not completely react in solution in the presence of calcium resinate. The mixture is heated at 110° to 150° C. until all the lime has reacted.

The zinc-calcium resinate solution thus obtained may be treated to recover the resinate for resolution in another solvent, if so desired, in the following manner. After the last of the lime has reacted, the solution may be heated to distill off the solvent and recover the zinc-calcium resinate. Live steam is introduced at the end to completely remove the solvent. Preferably, the mass is distilled without live steam until it has reached a temperature of about 200° C. and then, with continued heating, the temperature is raised while steam distillation is going on until the maximum temperature reached is about 250° C.

The characteristics of the final resin-like product so recovered will depend upon the proportions of zinc oxide and hydrated lime employed. 1% of zinc oxide (ZnO) will theoretically drop the acid value of the rosin 13.78 points, while 1% of hydrated lime (Ca(OH)$_2$) will drop the acid value 15.13 points. If then, for example, we start with a heat treated pale rosin having an acid value of 142, and add 7½% zinc oxide, the acid value will drop 103 points or to 39, leaving 39/15.1 or 2.58% of hydrated lime to be added in order to give theoretically a neutral resin-like product containing zinc and calcium resinates. We find that anywhere between 2.75 and 5% of hydrated lime can be safely added without forming a resin-like product that will gel on recovery from solution.

On the same basis, starting with 9% of zinc oxide, requiring 1.2% of hydrated lime to theoretically form a neutral resin-like product, we have successfully added from 2 to 5% of hydrated lime.

Similarly, with only 10.3% of zinc oxide required to form a neutral resin-like product, we can add 12% of zinc oxide and obtain a solution of a basic resin-like product. Such a product can not generally be recovered from the solution since it will gel on continued heating. But from 1 to 2.5% of hydrated lime can be added and the resulting resin-like product recovered will be stable and non-gelling. The calcium resinate formed by the addition of hydrated lime appears to have a stabilizing action.

The final product, produced in accordance with the method of Example 2, will, in general, have a very high melting point, ranging from 125° to 170° C. (capillary tube) compared to a starting rosin of a melting point below 50° C. Unless heated considerably above its melting point, the final product is very viscous.

By way of illustration, if the starting rosin of Example 2 be a WW wood rosin heat treated to X grade, with an acid value of about 142, rotation +20, and such rosin is reacted with 12% of zinc oxide and 1% of hydrated lime, the product is a clear resin-like product of N to WG color grade, having a melting point of 135° C. (capillary tube) and having a calculated available basicity sufficient to neutralize an equal weight of rosin of an acid value of 38.6 or 21% of abietic acid.

Another preferred resin-like product is made in accordance with the method of Example 2, using about 6% of zinc oxide and about 3% of hydrated lime. This product has a melting point of about 135° C. (capillary tube). Still another product may be made with about 7½% zinc oxide and about 3½% hydrated lime, the product having a melting point of about 160° C. (capillary tube). In general, the process of our invention comprises reacting more than 5 but not over 15% of zinc oxide, and between about 1 and 5.5% of hydrated lime with the rosin used as the starting material.

Several examples of the wide range of the proportions of zinc oxide and hydrated lime, expressed as percentages by weight of the rosin starting material, that will give a substantially clear, stable, non-gelling, permanently refusible solid resin-like product containing zinc and calcium resinates, may be summarized as follows:

(a) *Starting with a heat treated rosin (acid value 142)*

| ZnO | Ca(OH)₂ | Melting point |
|---|---|---|
| Per cent | Per cent | °C. |
| 6 | 3 | 135 |
| 7.5 | 2.5 | 135 |
| 7.5 | 3.5 | 160 |
| 9 | 2.5 | 125 |
| 9 | 5.5 | 145 |
| 12 | 1 | 135 |

(b) *Starting with a natural rosin (acid value 170)*

| ZnO | Ca(OH)₂ | Melting point |
|---|---|---|
| Per cent | Per cent | °C. |
| 6 | 3 | 130 |
| 6 | 5 | 165 |
| 7 | 4.5 | 185 |
| 9 | 3.5 | 170 |
| 9 | 4.5 | 185 |
| 12 | 3 | 170 |
| 15 | 3 | 165 |

On the basis of substantially complete reaction, the reaction products of rosin and 5, 6, 12, and 15% of zinc oxide would contain about 3.8, 4.6, 8.8, and 10.8%, respectively, of combined zinc; and the reaction products of rosin and 1%, 3%, and 5.5% of hydrated lime would contain about 0.5%, 1.6%, and 2.8% of combined calcium, respectively. The product claims set forth the percentages of zinc and calcium, calculated on this basis.

If neutral or slightly acid resin-like products containing zinc and calcium resinates are to be recovered from solutions as permanently refusible, non-gelling resins, any of the various rosins enumerated above may be used as the starting material, since calcium resinate can be used as the control, or stabilizer. However, a natural rosin, or a high acid value disproportionated rosin, or a high acid value hydrogenated rosin requires a higher percentage of calcium resinate as stabilizer; a heat treated rosin requires a lower percentage, and a catalytically polymerized rosin requires no calcium resinate as a stabilizer.

If the resin-like products containing zinc and calcium resinates to be recovered are basic, the same general relationship holds true, but a lower percentage of calcium resinate is required for each starting rosin compared to the requirements for a neutral or slightly acid resin-like product. The basic zinc resinate apparently itself acts partially as a stabilizer, so that as the percentage of basic zinc resinate is increased, a lower percentage of calcium resinate is required.

Throughout this specification and in the claims, where percentages are referred to, percentages by weight are intended unless otherwise specified. In the case of reacting proportions of zinc oxide or calcium hydroxide, the percentages expressed in the claims are based on the weight of the rosin acid-containing material. The percentages assume such rosin acid-containing material to have an acid value of about 142 or higher. The rosins that we prefer to use have acid values of that order of magnitude, but if the rosin acid-containing material to be used were found to have a considerably lower acid value, the percentages of zinc oxide and hydrated lime would be proportionately lower than the percentages herein specified for a rosin of about 142 acid value. The term rosin is used in the claims to indicate the primary starting material, such as a gum or wood rosin, or a pine oleoresin in its natural, heat treated, polymerized or hydrogenated state.

It will be understood also that the stable solutions of this invention include the solutions obtained by the interaction of dissolved rosin with zinc oxide and with hydrated lime as well as the solutions obtained by re-solution of the clear permanently refusible products obtained by removing the solvent from the stable solutions obtained as a result of the catalyzed reactions disclosed hereinabove. In other words, the final solvent removing step carried out, for instance, by steam distillation, may be omitted.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The method of preparing a stable, non-gelling solution of a zinc-calcium resinate capable of being isolated in the form of a high melting point, permanently refusible, resin-like product having a conchoidal fracture, which comprises dissolving a rosin in a solvent, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding thereto a zinc compound selected from the group consisting of zinc oxide and zinc hydroxide in an amount equivalent to more than 5 but not over 15% of zinc oxide by weight of said rosin, heating the resulting mass to a temperature and for a time sufficient to complete the reaction between the rosin and said zinc compound, adding between about 1 and 5.5% of hydrated lime by weight of said rosin to the reaction mass, and continuing heating until the reaction therebetween is complete.

2. The method of preparing a stable, non-gelling solution of a zinc-calcium resinate capable of being isolated in the form of a high melting point, permanently refusible, resin-like product having a conchoidal fracture, which comprises dissolving a partially polymerized rosin in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% of zinc oxide by weight of said rosin thereto, heating the resulting mass to a temperature and for a time sufficient to complete the reaction between the rosin and zinc oxide, adding between about 1 and 5.5% of hydrated lime by weight of said rosin to the reaction mass, and 3. The method of preparing a stable, non-gelling solution of a zinc-calcium resinate capable of being isolated in the form of a high melting point, permanently refusible, resin-like product, which comprises dissolving a rosin in a solvent to a minimum rosin concentration of at least 50% by weight of said solution, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% of zinc oxide by weight of said rosin thereto, heating the resulting mass at a temperature of between 100° and 150° C. for a time sufficient to complete the reaction between said rosin and zinc oxide, adding between about 1 and 5.5% of hydrated lime by weight of said rosin to the reaction mass, and continuing heating until the reaction therebetween is complete.

4. The method of preparing a stable, non-gelling solution of a zinc-calcium resinate capable of being isolated in the form of a high melting point, permanently refusible, resin-like product, which comprises dissolving a rosin in mineral spirits, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% of zinc oxide by weight of said rosin thereto, heating the resulting mass to a temperature and for a time sufficient to complete the reaction between said rosin and zinc oxide, adding between 1 and 5.5% of hydrated lime by weight of said rosin to the reaction mass, and continuing heating until reaction therebetween is complete.

5. The method of preparing a stable, non-gelling solution of a zinc-calcium resinate capable of being isolated in the form of a high melting point, permanently refusible, resin-like product, which comprises dissolving a rosin in a solvent, incorporating into said solution an effective amount of acetic acid as catalyst, adding more than 5 but not over 15% of zinc oxide by weight of said rosin thereto, heating the resulting mass at a temperature and for a time sufficient to complete the reaction between the rosin and zinc oxide, adding between about 1 and 5.5% of hydrated lime by weight of said rosin to the reaction mass, and continuing heating until reaction therebetween is complete.

6. The method of preparing a stable, non-gelling solution of a zinc-calcium resinate capable of being isolated in the form of a high melting point, permanently refusible, resin-like product, which comprises dissolving a rosin in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% of zinc oxide by weight of said rosin thereto, heating the resulting mass to cause said reaction to go substantially to completion, adding between about 1 and 5.5% of hydrated lime by weight of said rosin to the reaction mass, and continuing heating until the reaction therebetween is complete.

7. The method of preparing a stable, non-gelling solution of a zinc-calcium resinate capable of being isolated in the form of a high melting point, permanently refusible, resin-like product, which comprises dissolving a heat treated rosin in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding between 6 and 12% of zinc oxide by weight of said rosin, heating the resulting mass to a temperature and for a time sufficient to complete the reaction between said rosin and zinc oxide, adding between 1 and 5.5% of hydrated lime by weight of said rosin to said reaction mass, and continuing heating until the reaction therebetween is substantially complete.

8. The method of preparing a stable, non-gelling solution of a zinc-calcium resinate capable of being isolated in the form of a high melting point, permanently refusible, resin-like product, which comprises dissolving a partially polymerized rosin in a solvent to a minimum rosin content of 50% by weight of the resulting solution, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding about 12% of zinc oxide by weight of said rosin thereto, heating the resulting mass to between 100 and 150° C. for a time sufficient to complete the reaction between said rosin and zinc oxide, adding about 1% of hydrated lime by weight of said rosin to the reaction mass, and continuing heating until reaction therebetween is complete.

9. A stable non-gelling solution of a zinc-calcium resinate capable of being isolated in the form of a high melting point, permanently refusible, resin-like product containing more than 3.8% of combined zinc and at least 0.5% of combined calcium by weight.

10. A stable non-gelling solution of a zinc-calcium resinate capable of being isolated in the form of a permanently refusible product having a melting point between 125 and 170° C. (capillary tube) and containing between 3.8% and 10.8% of combined zinc and between 0.5 and 2.8% of combined calcium.

11. A stable non-gelling zinc-calcium resinate solution comprising the reaction product of a partially polymerized rosin and more than 5 but not over 15% of zinc oxide and from 1 to 5.5% of hydrated lime, said product being capable of being isolated in the form of a clear resin-like product having a melting point between 125 and 185° C. (capillary tube).

12. The method of preparing a zinc-calcium resinate in the form of a high melting point, permanently refusible, resin-like product, which comprises dissolving a partially polymerized rosin in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% by weight of the rosin of zinc oxide thereto, heating the resulting mass at a temperature and for a time sufficient to complete the reaction between said rosin and the zinc oxide, adding between 1 and 5.5% by weight of the rosin of hydrated lime to the reaction mass, continuing heating until the reaction therebetween is complete, and finally distilling off said solvent to recover the resin-like product remaining.

13. The method of preparing a zinc-calcium resinate in the form of a high melting point, permanently refusible, resin-like product, which comprises dissolving a rosin in mineral spirits, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% (by weight of the rosin) of zinc oxide thereto, heating the resulting mass at a temperature and for a time sufficient to complete the reaction between said rosin and the zinc oxide, adding between 1 and 5.5% (by weight of the rosin) of hydrated lime to the reaction mass, continuing heating until the reaction therebetween is complete, and finally distilling off said solvent to recover the resin-like product remaining.

14. The method of preparing a zinc-calcium resinate in the form of a high melting point, permanently refusible, resin-like product, which comprises dissolving a rosin in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding more than 5 but not over 15% (by weight of the rosin) of zinc oxide thereto, heating the resulting solution to drive off water formed in the reaction and to cause said reaction to go substantially to completion, adding between about 1 and 5.5% (by weight of the rosin) of hydrated lime to the reaction mass, continuing heating until the reaction therebetween is complete, and finally steam distilling off said solvent to recover the rosin-like product remaining.

15. A zinc-calcium resinate in the form of a high melting point, permanently refusible, resin-like product, containing more than 3.8% of combined zinc and at least 0.5% of combined calcium by weight.

16. A zinc-calcium resinate in the form of a permanently refusible product having a melting point between 125° and 170° C. (capillary tube) and containing between 3.8% and 10.8% of combined zinc and between 0.5% and 2.8% of combined calcium.

17. A zinc-calcium resinate comprising the reaction product of a partially polymerized rosin and more than 5 but not over 15% of zinc oxide and from 1 to 5.5% of hydrated lime, said product being a clear resin-like product having a melting point between 125° and 185° C. (capillary tube).

18. A zinc-calcium resinate in the form of a permanently refusible product having a melting point about 135° C. (capillary tube) and containing about 8.8% of combined zinc and about 0.5% of combined calcium.

19. A zinc-calcium resinate in the form of a permanently refusible product having a melting point of about 160° C. (capillary tube) and containing about 5.4% of combined zinc and about 1.8% of combined calcium.

20. A zinc-calcium resinate in the form of a permanently refusible resin-like product having a melting point of about 135° C. (capillary tube) and containing about 4.6% of combined zinc and about 1.6% of combined calcium.

ROBERT C. PALMER.
ANTHONY F. OLIVER.
EDWIN EDELSTEIN.